W. H. KING.
PRESS FOR STAMPING AND EMBOSSING SOAP.

No. 172,032. Patented Jan. 11, 1876.

Witnesses:
P. C. Dieterich
F. H. Duffy

Inventor:
Wm H. King
by his atty

UNITED STATES PATENT OFFICE.

WILLIAM H. KING, OF PHILADELPHIA, PENNSYLVANIA.

IMPROVEMENT IN PRESSES FOR STAMPING AND EMBOSSING SOAP.

Specification forming part of Letters Patent No. 172,032, dated January 11, 1876; application filed November 2, 1875.

*To all whom it may concern:*

Be it known that I, WM. H. KING, of the city and county of Philadelphia, and State of Pennsylvania, have invented a new and useful Improvement in Presses for Stamping and Embossing Soaps and other plastic substances; and I do hereby declare the following to be a sufficiently full, clear, and exact description thereof to enable persons skilled in the art to make and use the same, reference being had to the accompanying drawing, forming a part of this specification, and letters of reference marked thereon.

The nature of my invention consists, first, in the mode of constructing the upper end of a pendulum-lever with a toothed sector, engaging in the gate or plunger of the press, so as, with a small amount of material, I make a very strong and quickly-acting press; and, second, in the mode of arranging the pendulum-lever, by which the sector can be easily engaged or disengaged from the rack, and the gate adjusted vertically to adapt it to different heights of molds or dies.

Figure 1:
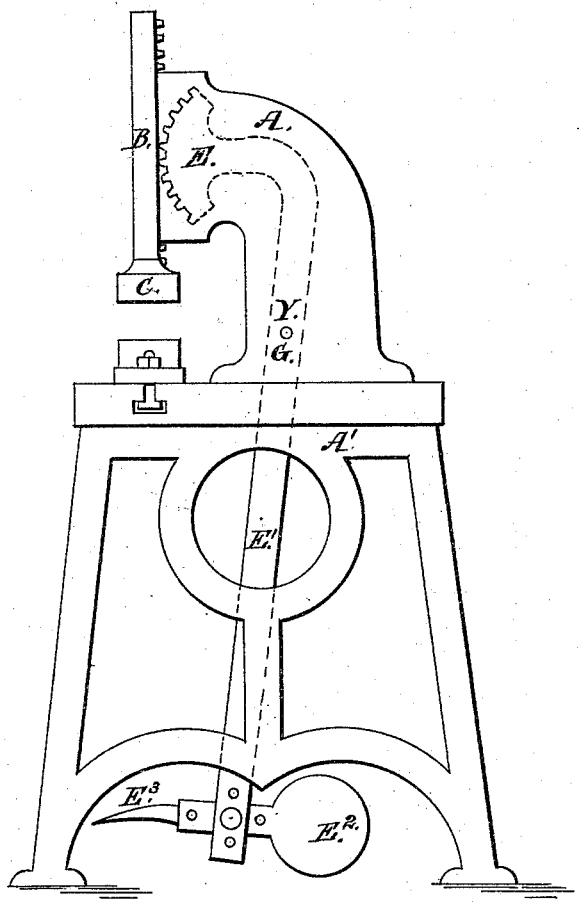
Figure 2:
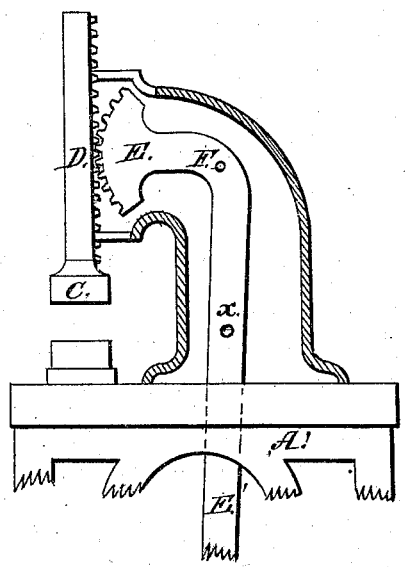

Figure 1 shows a side elevation of the invention, the rack and sector and upper part of the pendulum being shown in dotted lines; and Fig. 2, a section of the upper part of the press.

A represents the body or head of the press, mounted on suitable leg-frames A', and with vertical slides or guides B, carrying the gate or plunger C. D is a rack formed on the back of the gate B. E is a sector, having teeth engaging in the rack D. F is a bolt, forming the fulcrum of the sector E, and is made so that it may be withdrawn and replaced in the direction of its axis. The lower part $E^1$ of the sector E is formed in a long pendulum-lever, having a bob or weight, $E^2$, and treadle $E^3$ attached, preferably made adjustable by having several bolt-holes in both the lever $E^1$, to adjust the treadle in height, and in the bob $E^2$ and treadle $E^3$, to adjust it horizontally. A hole, X, is made through the lever $E^1$, and another hole, Y, coincident to it in the body A of the press. A bolt, G, is fitted so as to be easily placed in the holes X and Y, and upon withdrawing the fulcrum-bolt F the sector can be disengaged from the rack-teeth, as shown in Fig. 2, the gate can be raised or lowered, and, upon returning the sector to its former position, the bolt F replaced and the bolt G withdrawn.

The body, treadle, leg-frames, and bob of the press are preferably made of cast-iron, and the gate C, rack D, sector E, and pendulum-lever $E^1$ of steel.

What I claim as my invention is—

1. The pendulum and sector, in combination with the rack and gate, as and for the purpose set forth.

2. The bolt G, in combination with the lever $E^1$ and sector E, and removable bolt F, for adjusting the height of the gate, as set forth.

WM. H. KING.

Witnesses:
ROBERT R. SMITH,
THOS. J. STOUT.